H. L. FERRIS.
ANIMAL STALL.
APPLICATION FILED MAY 4, 1916.
1,197,193.
Patented Sept. 5, 1916.
3 SHEETS—SHEET 1.
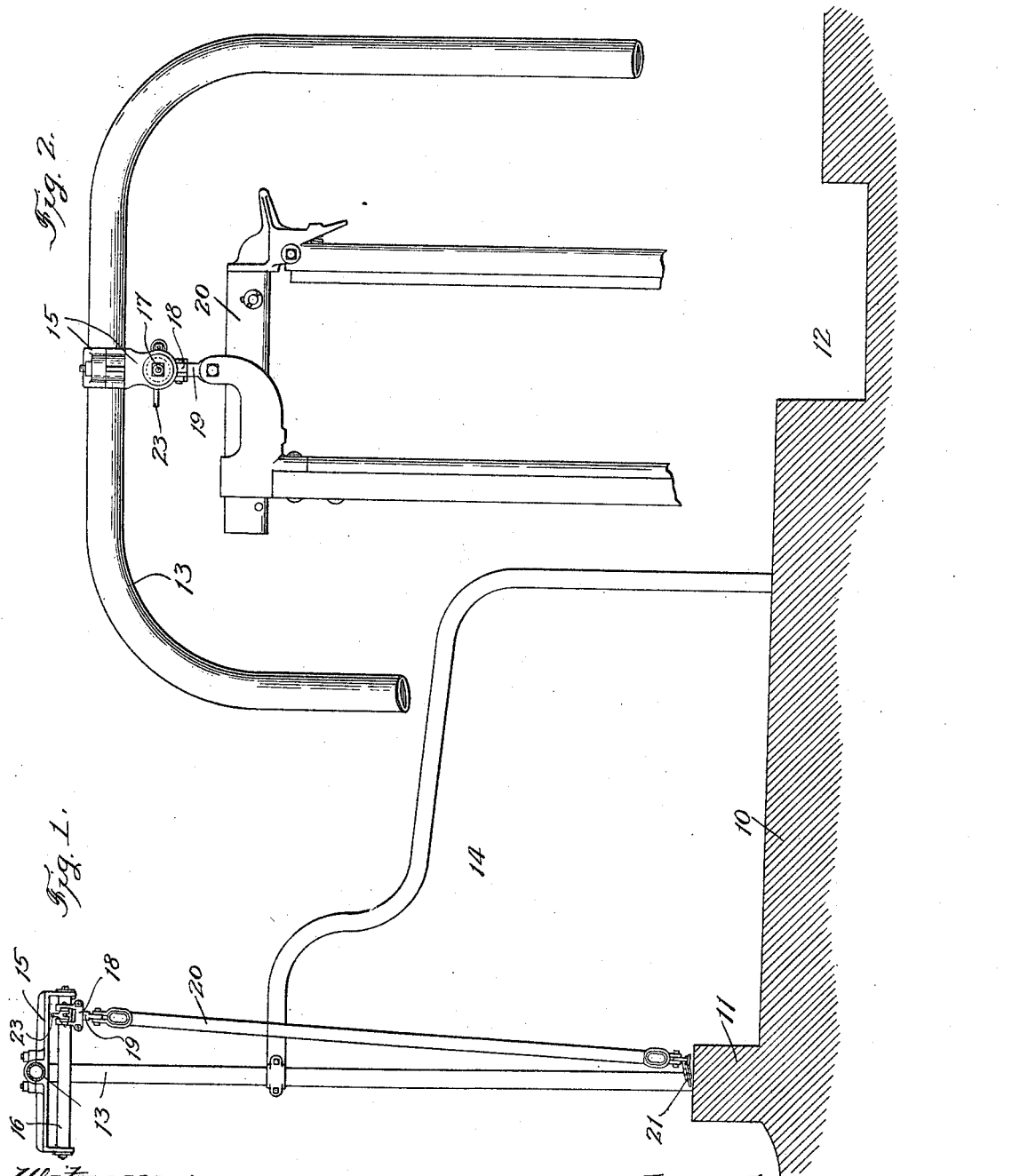

H. L. FERRIS.
ANIMAL STALL.
APPLICATION FILED MAY 4, 1916.
1,197,193.
Patented Sept. 5, 1916.
3 SHEETS—SHEET 2.
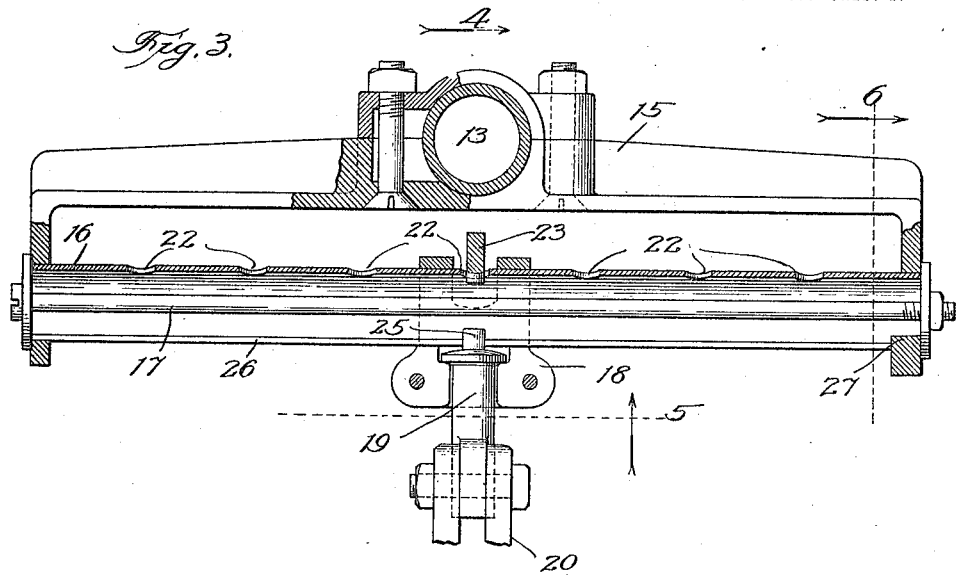
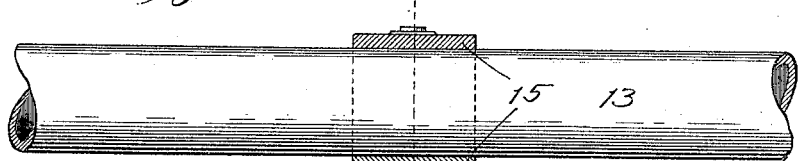
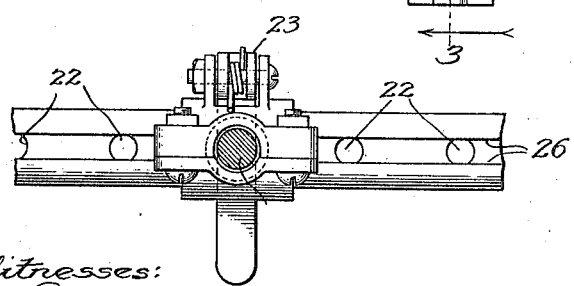
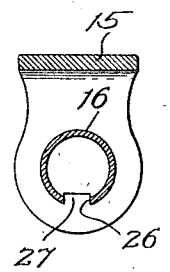
Inventor:
Henry L. Ferris,

H. L. FERRIS.
ANIMAL STALL.
APPLICATION FILED MAY 4, 1916.

1,197,193.

Patented Sept. 5, 1916.
3 SHEETS—SHEET 3.

Witnesses:
Inventor:
Henry L. Ferris,
By Dyrenforth, Lee, Chritton and Wiles,
Attys.

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

ANIMAL-STALL.

1,197,193.      Specification of Letters Patent.      Patented Sept. 5, 1916.

Application filed May 4, 1916. Serial No. 95,432.

*To all whom it may concern:*

Be it known that I, HENRY L. FERRIS, a citizen of the United States, residing at Harvard, in the county of McHenry and State of Illinois, have invented a new and useful Improvement in Animal-Stalls, of which the following is a specification.

My invention relates to certain improvements in animal stalls, and is particularly directed to the type of quick-adjustable stall described in my prior Patent No. 1,172,236, of February 15, 1916.

The present invention will be more fully understood from the following detailed description taken in connection with the accompanying drawings, in which—

Figure 7:
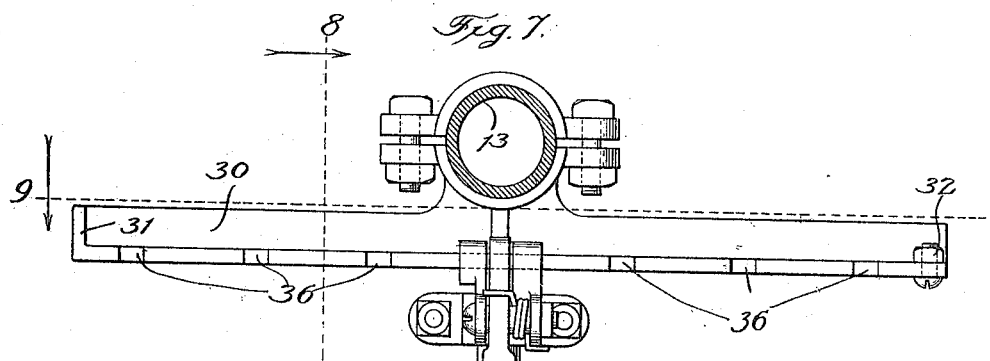
Figure 8:
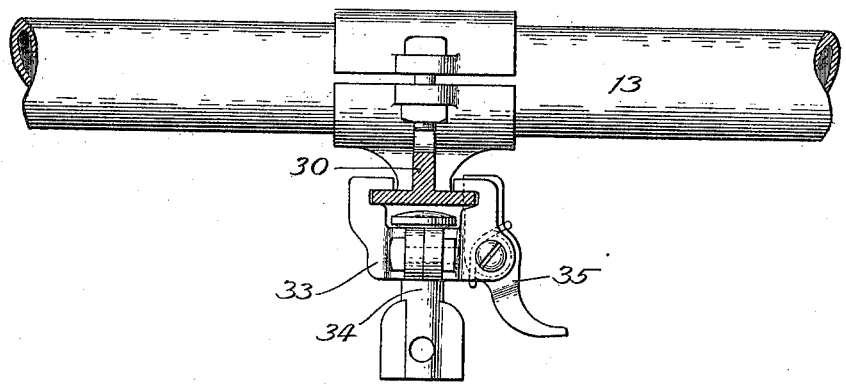
Figure 9:
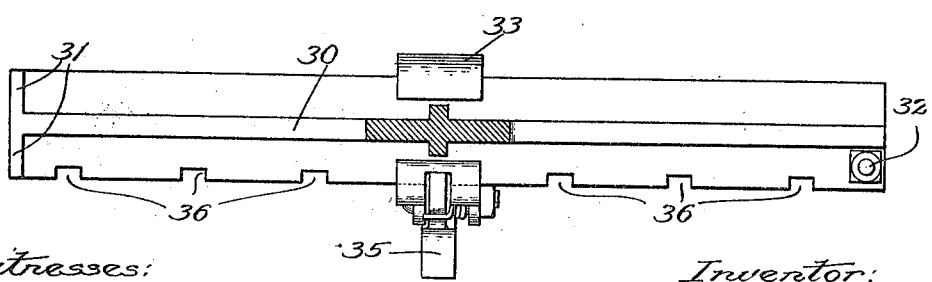

Figure 1 is a longitudinal section through a stall-frame and the base thereof; Fig. 2 is an enlarged elevation of the upper end of the stall-frame showing the manner of hanging the stanchion therein; Fig. 3 is an enlarged longitudinal section through the quick adjustable stanchion-hanger, the section being taken on the line 3 of Fig. 4; Fig. 4 is a central transverse section through Fig. 3; Fig. 5 is a section on the line 5 of Fig. 3; Fig. 6 is a section on the line 6 of Fig. 3; Fig. 7 is a section through the upper stall-bar showing a modified form of stanchion adjuster in side elevation; Fig. 8 is a section on the line 8 of Fig. 7, and Fig. 9 is a section on the line 9 of Fig. 7.

Referring more particularly to Figs. 1 to 6 of the drawings, the numeral 10 designates a suitable base, or foundation, for a stall, such foundation being usually constructed of concrete, molded to provide a curb 11 at the front of the stall, and a gutter 12 at the rear of the stall. The curb 11 supports a vertical arch 13 which forms the front of the stall, and which is supported by stall-partition bars 14 which extend longitudinally of the stall, and at their rear ends are mounted in the base 10. The top bar of the arch 13 has mounted transversely thereof a casting 15 having downwardly-depending ends, between which is mounted a track 16 which, as shown in Fig. 3, is formed as a tubular member secured in place by a tie-rod 17. Loosely embracing the track 16 there is a traveler 18, the lower end of which supports a swivel 19 from which there is hung an animal stanchion 20. The lower end of the stanchion is flexibly connected with the base of the stall, as by means of a chain 21, shown in Fig. 1.

It is the purpose of the traveler 18 to support the stanchion 20 in various positions of longitudinal adjustment with reference to the stall, in order that the animal secured in the stanchion may be properly alined with the gutter 12, all as is more fully pointed out in my prior patent referred to. With this end in view the tubular track 16 is provided in its upper face with a plurality of perforations 22 suitably spaced along the length of the track, and the traveler 18 has a spring-held arm 23 pivoted thereto, as shown in Fig. 4, the arm having a depending lug 24 centrally located and adapted for engagement with any selected locking aperture 22 in the track. The stanchion-swivel 19 is preferably provided with an upstanding boss 25 which enters and rides within a slot 26 extending from end to end of the lower face of the tubular track. and the track-member is prevented from rotating by a lug 27 (Fig. 6) formed in one of the depending ends of the casting 15, and in the assembled position of the parts entering the end of the slot 26.

It will be understood that the type of stall above described will generally be used in relatively large installations, that is installations capable of caring for a herd of dairy cattle, or the like. In such service the cattle will be introduced into the stalls indiscriminately, and since, ordinarily, there will be a marked variation in size or length of the individual members of the herd, it becomes necessary, for the proper sanitation of the barn, that the stanchions be individually adjusted at the time the cattle enter them, so that each animal will occupy its proper position with reference to the gutter. This object may be quickly and conveniently accomplished by the use of the apparatus described. As the animal enters the stall, the attendant will close the stanchion 20 about the neck of the animal, and at the same time by lifting the arm 23 on the traveler 18, will free that member from its track and shift the upper end of the stanchion forwardly or rearwardly, while the animal is held therein, until a proper alinement with the gutter is effected. The arm 23 will then be permitted to drop into the aperture 22 nearest the proper adjusted position. The operation described may be performed in a fraction of a minute, and with the greatest convenience.

In Figs. 7 to 9 I have illustrated a modified form of track and a modified construction of traveler adapted for coöperation with the track. The track-member here shown comprises a casting 30, generally T-shaped in cross-section, as shown in Fig. 8, and having webs 31 at one end which serve as stops to prevent the traveler from running off of the track. At the opposite end a bolt 32 may be inserted after the traveler is assembled on the track, to perform a like function. The traveler here shown comprises a generally U-shaped two-piece casting designated 33, and having its arms recessed to embrace the flanges of the track. A mushroom headed swivel 34 is journaled in the bottom of the traveler, and for locking the traveler in any adjusted position along the length of the track there is provided a spring-pressed trigger-arm 35, the upper end of which engages notches 36 provided at suitably spaced intervals along one edge of the track.

The operation of the structure shown in Figs. 7 to 9 will be fully understood from the foregoing description, taken in connection with the more detailed description of the construction and operation of the apparatus illustrated by Figs. 1 to 6.

While I have shown and described in some detail two specific embodiments of the invention, it is to be understood that these are illustrative only, and for the purpose of making the invention more clear, and are not to be construed as limitations thereof, except in so far as such limitations have been included within the terms of the following claims, in which it is my intention to claim all novelty inherent in my invention as broadly as is permissible, in view of the prior art.

What I claim as new, and desire to secure by Letters Patent, is—

1. In combination, a stall provided with a gutter, a track longitudinally disposed with reference to the stall, a traveler mounted upon the track to move freely from end to end thereof, a stanchion supported by the said traveler, and means carried by the traveler for locking the traveler in a variety of positions along the track and adapted to release and lock the same quickly to permit its adjustment while an animal is held thereby.

2. In combination, a stall provided with a gutter, a track mounted longitudinally of the stall and having recesses along its length, a traveler supported by the track for free movement from end to end of the same, a stanchion supported by the traveler, and a spring held locking device carried by the traveler and adapted to release and lock the same to the track quickly by coaction with said recesses to permit its adjustment while an animal is held thereby.

3. In combination, a stall provided with a gutter, a track-member having recesses therein at spaced intervals along its length and mounted longitudinally of the stall, a traveler embracing the said track and slidable freely along the same from end to end thereof, a stanchion hung from the said traveler, and a manually and quickly operable locking member carried by the traveler and adapted for engagement with the recesses of the track to release and lock the same quickly to permit its adjustment while an animal is held thereby.

HENRY L. FERRIS.

Copies of this patent may be obtained for five cents each, by addressing the "Commissioner of Patents, Washington, D. C."